(12) United States Patent
Guo et al.

(10) Patent No.: US 7,653,055 B2
(45) Date of Patent: Jan. 26, 2010

(54) METHOD AND APPARATUS FOR IMPROVED MULTICAST STREAMING IN WIRELESS NETWORKS

(75) Inventors: Katherine H. Guo, Eatontown, NJ (US); Arun Narayen Netravali, Westfield, NJ (US); Krishan K. Sabnani, Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 530 days.

(21) Appl. No.: 11/396,371

(22) Filed: Mar. 31, 2006

(65) Prior Publication Data

US 2007/0230496 A1 Oct. 4, 2007

(51) Int. Cl.
*H04L 12/56* (2006.01)
*H04W 24/00* (2006.01)
(52) U.S. Cl. ........................ 370/389; 455/423
(58) Field of Classification Search ............... 370/389; 455/423
See application file for complete search history.

(56) References Cited

U.S. PATENT DOCUMENTS 6,356,545 B1 * 3/2002 Vargo et al. ................. 370/355
2001/0048662 A1 * 12/2001 Suzuki et al. ............... 370/230
2004/0132442 A1 * 7/2004 Zimmermann et al. ...... 455/423

* cited by examiner

*Primary Examiner*—Ricky Ngo
*Assistant Examiner*—Clemence Han
(74) *Attorney, Agent, or Firm*—Wall & Tong, LLP

(57) ABSTRACT

The invention includes a method and apparatus for providing media content. The method includes duplicating each packet of an original packet stream for which an associated importance level satisfies an importance condition, inserting each duplicate packet within the original packet stream to form thereby a modified packet stream, and transmitting the modified packet stream toward a wireless terminal adapted for processing the modified packet stream for presenting the media content conveyed by the original packet stream. The duplicate packets may be inserted within respective windows associated with the duplicate packets, wherein each window is determined according to an original packet position associated with the original packet from which the duplicate packet is formed.

21 Claims, 10 Drawing Sheets

METHOD AND APPARATUS FOR IMPROVED MULTICAST STREAMING IN WIRELESS NETWORKS

FIELD OF THE INVENTION

The invention relates to the field of communication networks and, more specifically, to multicast streaming of multimedia content in wireless networks.

BACKGROUND OF THE INVENTION

To distribute streaming multimedia content to multiple mobile terminals, service providers typically use cost-effective broadcast multicast architecture of Third Generation (3G) wireless networks. In the existing 3G broadcast multicast architecture, multimedia content distribution spans from a content server in the core network to mobile terminals over a radio access network (RAN) using associated multicast groups formed at a gateway between the core network and the RAN. In existing 3G wireless networks, content servers improve transport reliability of distributed media streams using robustness features built into associated media codecs, and, optionally, transport level mechanisms such as Forward Error Correction (FEC). Disadvantageously, once wireless terminals join a multicast group, the wireless terminals receive the associated media stream with fixed encoding and fixed error protection applied by the content server.

SUMMARY OF THE INVENTION

Various deficiencies in the prior art are addressed through the invention of a method and apparatus for providing media content. The method includes duplicating each packet of an original packet stream for which an associated importance level satisfies an importance condition, inserting each duplicate packet within the original packet stream to form thereby a modified packet stream, and transmitting the modified packet stream toward a wireless terminal adapted for processing the modified packet stream for presenting the media content conveyed by the original packet stream. The duplicate packets may be inserted within respective windows associated with the duplicate packets, wherein each window is determined according to an original packet position associated with the original packet from which the duplicate packet is formed.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Various embodiments of the present invention utilize selective packet duplication for improving transport reliability for streaming media content. In one embodiment, selective packet duplication is performed using at least one packet characteristic associated with each data packet of a data packet stream conveying media content. In one embodiment, packet duplication is performed using an importance level of each data packet of a data packet stream conveying media content. In one such embodiment, each data packet satisfying an importance condition (e.g., having a specific importance level) is duplicated and each data packet not satisfying an importance condition (e.g., not having the specific importance level) is not duplicated.

Various embodiments of the present invention utilize selective error correction strengthening for improving transport reliability for streaming media content. In one embodiment, selective error correction strengthening is performed using at least one packet characteristic associated with each data packet of a data packet stream conveying media content. In one embodiment, error correction strengthening is performed using an importance level of each data packet of a data packet stream conveying media content. In one such embodiment, each error correction packet associated with a data packet satisfying an importance condition (e.g., having a specific importance level) includes enhanced error correction strength and each error correction packet associated with a data packet not satisfying an importance condition (e.g., not having a specific importance level) includes standard error correction strength.

The present invention improves the transport reliability of streaming media content, thereby improving user-perceived content presentation quality. In one embodiment, selective error correction strengthening may be used in conjunction with selective packet duplication, thereby enabling further improvements in transport reliability for streaming media content. In one such embodiment, enhanced forward error correction (FEC) may be used in conjunction with selective packet duplication. In one embodiment, in which the present invention is utilized for improving transport reliability for coding standards having a low frequency of important packets (e.g., MPEG-4), significant improvements in transport reliability may be realized with a minimal bandwidth increase.

Figure 1:
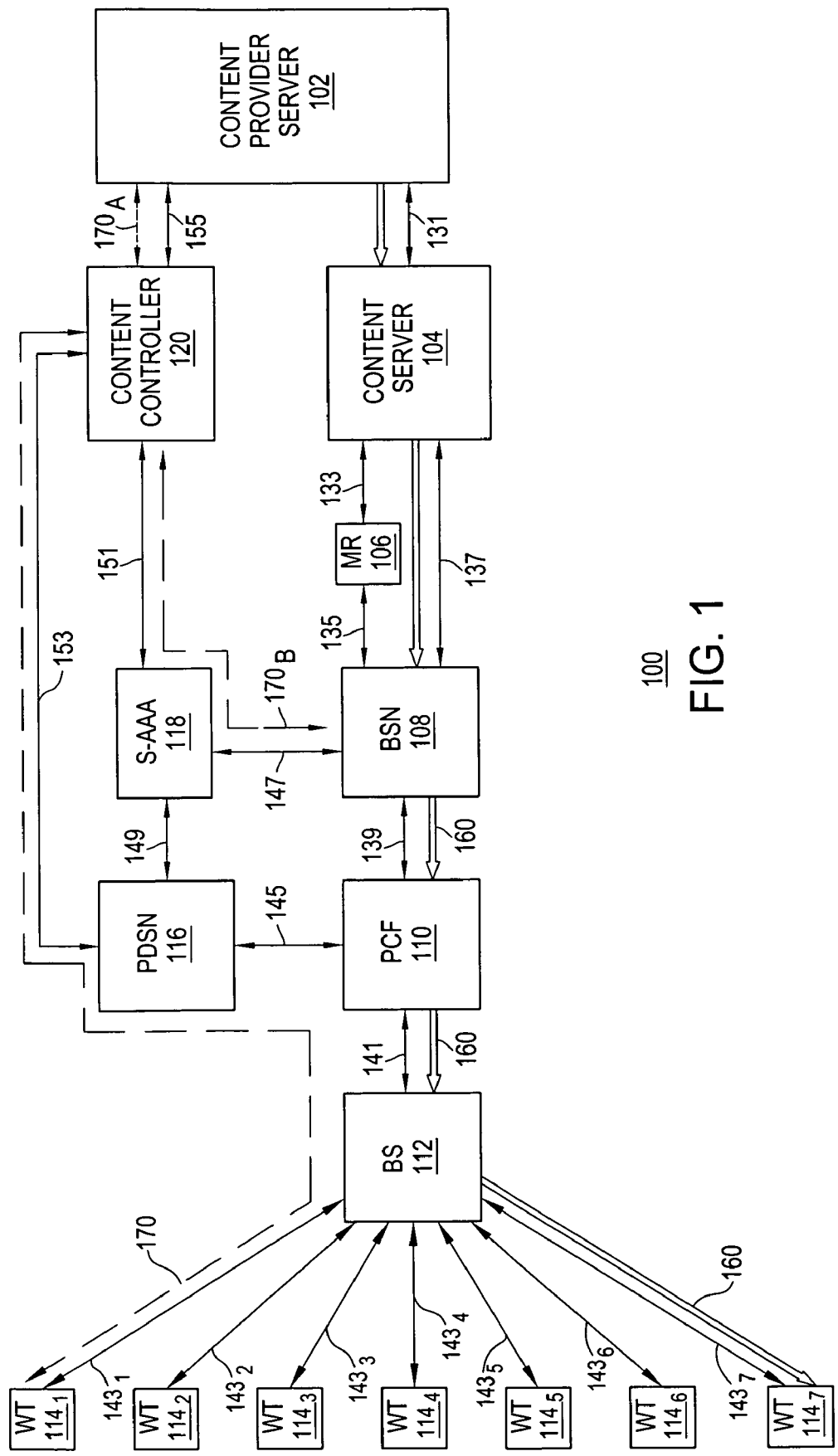
FIG. 1 depicts a high-level block diagram of logical components of a communication network.

FIG. 1 depicts a high-level block diagram of a communication network. In general, communication network 100 of FIG. 1 comprises a communication network supporting broadcast multicast services for wireless terminals. Specifically, communication network 100 of FIG. 1 includes a content provider server (CPS) 102, a content server (CS) 104, a multicast router (MR) 106, a broadcast serving node (BSN) 108, a packet control function (PCF) 110, a base station (BS) 112, a plurality of wireless terminals (WTs) $114_1$-$114_7$ (collectively, WTs 114), a packet data serving node (PDSN) 116, a Serving Authentication, Authorization, Accounting server (S-AAA) 118, and a content controller (CC) 120. As depicted in FIG. 1, PCF 110, BS 112, and WTs 114 operate as a radio access network (RAN).

As depicted in FIG. 1, CPS 102 and CS 104 communicate using a link 131. In one embodiment, CS 104 and BSN 108 communicate using a unicast path 137 which may be a direct link or, alternatively, may include multiple unicast links connected by unicast routers (not depicted) between CS 104 and BSN 108. In one embodiment, CS 104 and BSN 108 communicate using a multicast path 133 from CS 104 to MR 106 and a multicast path 135 from MR 106 to BSN 108. Although depicted as an indirect multicast path between CS 104 and BSN 108, in one embodiment, a direct multicast path may be used between CS 104 and BSN 108. Although not depicted, in one embodiment, one or both of multicast paths 133 and 135 may include multiple multicast paths connected by other routers between CS 104 and MR 106 or MR 106 and BSN 108, respectively.

As depicted in FIG. 1, BSN 108 and PCF 110 communicate using a link 139, and PCF 110 and BS 112 communicate using a link 141. As depicted in FIG. 1, BS 112 and WTs $114_1$-$114_7$ communicate using a plurality of wireless links (WLs) $143_1$-$143_7$ (collectively, WLs 143), respectively. As depicted in FIG. 1, PCF 110 and PDSN 116 communicate using a link 145, S-AAA 118 and BSN 108 communicate using a link 147, S-AAA 118 and PDSN 116 communicate using a link 149, S-AAA and CC 120 communicate using a link 151, CC 120 and PDSN 116 communicate using a link 153, and CC 120 and CPS 102 communicate using a link 155.

The CPS 102 provides multimedia content (e.g., audio content, video content, and the like) to CS 104. In one embodiment, CPS 102 provides real-time multimedia content. In one embodiment, CPS 102 stores multimedia content. In one embodiment, content may be provided as programs. In one embodiment, CPS 102 is maintained by a third party provider. In one embodiment, CPS 102 streams content to CS 104. In one embodiment, CPS 102 provides content to CS 104 in response to control signals received from CC 120. In one embodiment, control signals received by CPS 102 from CC 120 may originate from WTs 114 (e.g., content requests initiated by users associated with WTs 114). In this embodiment, signaling originating from WTs 114 may traverse a signaling path originating on WTs 114, traversing BS 112, PCF 110, and PDSN 116, and terminating on CC 120.

The CS 104 receives content from CPS 102. The CS 104 encodes multimedia content for transmission to BSN 108 over the core network. In one embodiment, CS 104 provides real-time video encoding of live programs and pre-processed video encoding of scheduled programs. As depicted in FIG. 1, CS 104 streams content from CPS 102 to BSN 108 (and, optionally, other BSNs (not depicted for purposes of clarity)). In one embodiment, CS 104 streams content to BSN 108, for each multicast group, as a media stream. In one embodiment, CS 104 streams the media stream to BSN 108 for each multicast group using varying levels of quality. The BSN 108 receives the streaming content from CS 104 as a data packet stream (referred to herein as an original data packet stream).

The CS 104 may stream content to BSN 108 directly (using a unicast connection between CS 104 and BSN 108) or indirectly (using a unicast connection between CS 104 and MR 106 and a multicast connection between MR 106 and BSN 108). In one embodiment, transmission (unicast or multicast) of content from CS 104 to BSN 108 is performed using Internet Protocol (IP) and Real Time Protocol (RTP). In one embodiment, CS 104 distributes content to BSN 108 using IP multicast (where BSN 108 functions as one of the leaves of the IP multicast tree (and, optionally, other BSNs (not depicted for purposes of clarity) function as other leaves of the IP multicast tree). In one embodiment, CS 104 distributes content to BSN 108 using unicast over dedicated IP tunnels between CS 104 and BSN 108 (and, optionally, other BSNs).

In one embodiment, CS 104 applies error correction to encoded media streams transmitted from CS 104 to BSN 108. In one embodiment, CS 104 generates an error correction packet stream corresponding to a data packet stream (e.g., each error correction packet is generated using information from at least one associated data packet). In one embodiment, CS 104 applies forward error correction to encoded media streams. The CS 104 provides the error correction packet stream to BSN 108 (and, optionally, other BSNs (not depicted for purposes of clarity)). In one embodiment, CS 104 provides the error correction packet stream to BSN 108 using the multicast flow by which the associated data packet stream is streamed to BSN 108. The BSN 108 receives the error correction packet stream (referred to herein as an original error correction packet stream) from CS 104.

As depicted in FIG. 1, for given content, BSN 108 advertises the media group to WTs 114, and each WT 114 may select one of the media groups conveying preferred content. A media stream is associated with a respective media group. The media group is conveyed using a respective multicast flow. In one embodiment, a content identifier identifies content conveyed by a media stream and a multicast flow identifier identifies the multicast flow conveying the media stream. In one embodiment, BSN 108 only advertises a media stream in response to a request by one or more of WTs 114. In one such embodiment, BSN 108 only advertises a media stream in response to a threshold number of requests by WTs 114. The WTs 114 may join and leave the media groups (and, therefore, the associated multicast flows) dynamically.

The BSN 108 performs at least a portion of the functions of the present invention. In one embodiment, BSN 108 performs selective packet duplication for improving transport reliability for streaming media content. In one embodiment, BSN 108 performs selective error correction strengthening for improving transport reliability for streaming media content. In one embodiment, BSN 108 performs selective error correction strengthening in conjunction with selective packet duplication, thereby enabling further improvements in transport reliability for streaming media content. The BSN 108 improves the transport reliability of streaming media content, thereby improving user-perceived content presentation quality of media content presented on associated wireless terminals.

The BSN 108 multicasts content to WTs 114. As depicted in FIG. 1, BSN 108 multicasts media streams to WTs 114 belonging to the respective media groups using multicast flows associated with the media groups (i.e., each media stream is multicast over a different multicast tree using a different multicast flow associated with a different media group). The BSN 108 transmits multicast traffic to PCF 110. In one embodiment, BSN 108 transmits the multicast traffic to PCF 110 using an A10 interface. The PCF 110 transmits multicast traffic to BS 112. In one embodiment, PCF 110 transmits the multicast traffic to BS 112 using an A8 interface. The BS 112 includes a base station controller and at least one base transceiver station controlled by the base station controller. The BS 112 transmits the multicast traffic to WTs 114.

As depicted in FIG. 1, a data channel 160 conveys multimedia content from CPS 102 to WT $114_7$. As depicted in FIG. 1, data channel 160 traverses a path including CPS 102, CS 104, MR 106 (optionally), BSN 108, PCF 110, BS 112, and WT $114_7$. As depicted in FIG. 1, a control channel 170, including control channel portions $170_A$ and $170_B$, conveys control information between WTs 114 and communication network 100. As depicted in FIG. 1, control channel 170 traverses a path including WT $114_1$, BS 112, PCF 110, PDSN 116, and CC 120, control channel portion $170_A$ traverses a path including CC 120 and CPS 102, and control channel portion $170_B$ traverses a path including CC 120, S-AAA 118, and BSN 108. As depicted in FIG. 1, WTs 114 may be adapted for processing data signals and control signals associated with such data channels and control channels.

The WTs 114 include wireless terminals operable for receiving and transmitting various wireless signals adapted for conveying various information, including voice content, multimedia content, control signals and the like, as well as various combinations thereof. In one embodiment, WTs 114 comprise mobile handsets. In one embodiment, in which communication network 100 is implemented as a CDMA2000 1×RTT network, WTs 114 may be denoted as mobile stations (MSs). In one embodiment, in which communication network 100 is implemented as a CDMA2000 EvDO network or CDMA2000 HRPD network, WTs 114 may be denoted as access terminals (ATs).

The WTs 114 operate as presentation devices. The WTs 114 include user interfaces. The WTs 114 may process received information (e.g., voice communication, video clips, and the like) for presentation via the user interface (e.g., speaker, screen, and the like). The WTs 114 may process information (e.g., voice communications, pictures, and the like) captured via the user interface (e.g., microphone, camera, and the like) for transmission toward the network. In one embodiment, WTs 114 may include various other control modules, input-output modules, interface modules, and the like, as well as various combinations thereof. In one embodiment, control channels may be implemented between WTs 114 and network elements (illustratively, CC 120, BSN 108, and the like) for performing various control functions.

In one embodiment, WTs 114 process each packet of a received data packet stream to form a presentation stream adapted for use by respective WTs 114 for presenting media content via respective user interfaces. In one embodiment, WTs 114 process a received packet stream according to a packet order determined according to a sequence number associated with each packet in the modified packet stream. In one embodiment, in which a received packet stream is a modified packet stream including duplicate packets, WTs 114 process for inclusion in the presentation stream only those duplicate packets for which the respective original packets are missing or corrupted. In one embodiment, in which a presentation stream is formed using an error correction packet stream, WTs 114 process the error correction packets for correcting errors in the received data packet stream conveying media content.

In one embodiment, WTs 114 utilize control channels for conveying control signals adapted for controlling multimedia content received by WTs 114. In one embodiment, the control signals may include commands entered by users via user interfaces of WTs 114. In one embodiment, control signals adapted for controlling multimedia content may be transmitted from WTs 114 to CC 120 (e.g., traversing BS 112, PCF 110, and PDSN 116 (illustratively, control channel 170)). In one embodiment, control channels between WTs 114 and CC 120 may be implemented as bidirectional unicast connections. In one such embodiment, WTs 114 may retrieve information (e.g., content, session, and the like) from CC 120 using Transmission Control Protocol (TCP) and Hypertext Transfer Protocol (HTTP).

The CC 120 processes control signals received from WTs 114. The CC 120 signals CPS 102 according to commands conveyed by the control signals received from WTs 114 (illustratively, using control channel portion $170_A$). In one embodiment, in which control signals received from WTs 114 include requests for multimedia content, CC 120 may request that CPS 102 begin streaming requested multimedia content (e.g., a requested audio clip, video clip, and the like) towards WTs 114. In one embodiment, in which control signals received from WTs 114 include requests for executing trick-play functions (e.g., rewind, pause, and the like), CC 120 may request that CPS 102 provide trick-play functions for multimedia content streaming from CPS 102 to WTs 114. Although specific control functions are described, CC 120 may support various other functions for controlling CPS 102.

As depicted in FIG. 1, communication network 100 is implemented as a Third Generation Partnership Project Two (3GPP2) Code Division Multiple Access 2000 (CDMA-2000) network. In one embodiment, communication network 100 may be implemented as one of a CDMA2000 One Times Radio Transmission Technology (1×RTT) network, a CDMA2000 Evolution Data Optimized (EvDO) network, a CDMA2000 High Rate Data Packet (HRDP) network, and the like. Although primarily depicted and described herein with respect to a CDMA2000 network, in one embodiment, communication network 100 may be implemented as a Third Generation Partnership Project (3GPP) Universal Mobile Telecommunications System (UMTS) network. Although primarily depicted and described with respect to 3GPP and 3GPP2 networks, in one embodiment, communication network 100 may be implemented using various other networking technologies.

As depicted in FIG. 1, communication network 100 of FIG. 1 is adapted for conveying multimedia content from a content provider (illustratively, CPS 102) to wireless terminals (illustratively, WTs 114). In general, 3GPP2 networks support Broadcast Multicast Service (BCMCS) and 3GPP networks support Multimedia Broadcast Multicast Services (MBMS). In general, multicast is an efficient means of transmitting the identical content to multiple receivers while minimizing network resource usage, supporting a wide range of multimedia services for wireless networks. In general, multimedia services such as live television, news summaries, sports highlights, local traffic and weather reports, and the like, as well as various combinations thereof, may be efficiently delivered (scheduled or on-demand) to wireless terminals using broadcast multicast.

Although 3GPP, 3GPP2, and like networking standards depicted and described with respect to FIG. 1 define specific configurations of network components suggested for providing specific functionality, such standards typically specify logical configurations of network components (leaving physical implementations unspecified). As depicted in FIG. 1, communication network 100 comprises a specific configuration in which each logical component is implemented as a standalone physical component. In one embodiment, depicted and described herein with respect to FIG. 2, various combinations of logical network components depicted and described herein with respect to FIG. 1 may be implemented using other combinations of physical network components.

Figure 2:
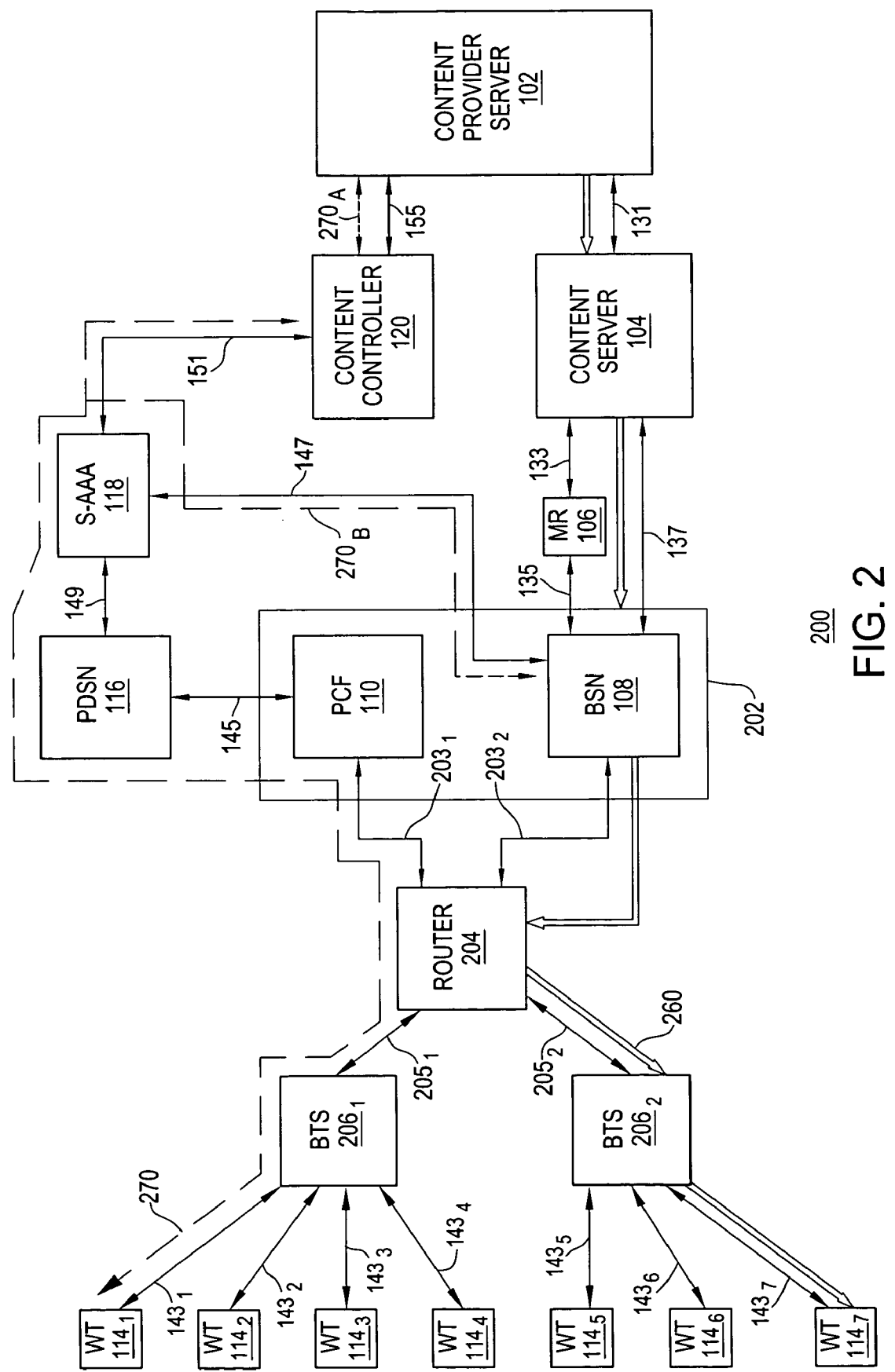
FIG. 2 depicts a high-level block diagram of a physical implementation of the communication network of FIG. 1.

FIG. 2 depicts a high-level block diagram of a physical implementation of the communication network of FIG. 1. Specifically, with some exceptions, physical communication network 200 of FIG. 2 is substantially similar to communication network 100 of FIG. 1. As depicted in FIG. 2, BSN 108 and PCF 110 may be implemented as portions of a base station controller (e.g., radio network controller (RNC)). As depicted in FIG. 2, BSN 108 and PCF 110 communicate with WTs 114 using a router 204 and a plurality of base transceiver stations (BTSs) $206_1$-$206_2$ (collectively, BTSs 206). As depicted in FIG. 2, BSN 108 and PCF 110 communicate with router 204 using links $203_1$ and $203_2$ (collectively, links 203), respectively, and router 204 communicates with BTSs $206_1$ and $206_2$ using links $205_1$ and $205_2$ (collectively, links 205), respectively. As depicted in FIG. 2, BTSs $206_1$ and $206_2$ communicate with WTs $114_1$-$114_4$ and $114_5$-$114_7$, respectively.

As depicted in FIG. 2, a data channel 260 (similar to data channel 160 depicted and described herein with respect to FIG. 1) conveys multimedia content from CPS 102 to WT$114_7$. As depicted in FIG. 2, data channel 260 traverses a path including CPS 102, CS 104, MR 106 (optionally), BSN 108, router 204, BTS $206_2$, and WT $114_7$. As depicted in FIG. 2, a control channel 270 including control channel portions $270_A$ and $270_B$ (similar to control channel 170 and control channel portions $170_A$ and $170_B$ depicted and described herein with respect to FIG. 1), conveys control information between WT $114_1$ and communication network 200. As depicted in FIG. 1, control channel 270 traverses a path including WT $114_1$, BTS $206_1$, router 204, PCF 110, PDSN 116, S-AAA 118, and CC 120. Although omitted for purposes of clarity, each WT 114 may support respective data and control channels.

Although primarily depicted and described herein with respect to specific network configurations of network components, network functions, communication links, data flows, control flows, and the like, the present invention may be implemented using various other network configurations of network components, network functions, communication links, data flows, control flows, and the like, as well as various combinations thereof. Although, for purposes of clarity, depicted and described with respect to one base station (illustratively, BS 112), in one embodiment, BSN 108 may broadcast multicast flows over a plurality of base stations serving respective pluralities of wireless terminals.

As described herein, the present invention improves the transport reliability of streaming media content, thereby improving user-perceived content presentation quality of media content. For purposes of clarity in describing the present invention, the present invention is discussed with the context of a system transporting Motion Picture Experts Group (MPEG) media streams from content servers of a core network to wireless terminals associated with a radio access network using a gateway element between the core and radio access networks. Although primarily depicted and described with respect to MPEG-based media streams, the present invention may be used for improving transport reliability for various other networks, protocols, content, and the like, as well as various combinations thereof.

In general, MPEG-compliant systems transport media content (e.g., video content) using three frame types (i.e., intra-picture frames (denoted as I-frames), predicted frames (denoted as P-frames), and bi-predictive frames (denoted as P-frames)). The I-frames use intra-frame prediction, requiring reference to a current frame without reference to any past frames or future frames. The P-frames use inter-frame prediction, requiring reference to the nearest past I-frame or P-frame. The B-frames use bidirectional inter-frame prediction, requiring both past and future frames as references. A typical MPEG-encoded video sequence includes a mixture of I-frames, P-frames, and B-frames. The frequency of I-frames (the most important frame type for MPEG decoders) in an encoded video stream is significantly smaller than the frequency of P-frames and B-frames.

In one embodiment, RTP may be used for transporting MPEG-frames. In this embodiment, RTP packets include a header portion and a payload portion. The RTP packet header portion includes various parameters. The RTP packet payload portion includes MPEG frames. The RTP packet payload format (for standard video codecs) is standardized (i.e., for MPEG-4, RFC3640 specifies RTP payload format; for H.264, RFC3984 specifies RTP payload format). In order to maintain proper ordering of RTP packets required for proper presentation of the transported content on a terminal device, RTP packet headers include a sequence number field. In one embodiment, the sequence number field may be used by wireless terminals for identifying duplicate RTP packets.

As described herein, in one embodiment, in which RTP packets convey MPEG video frames, I-frames may be considered more important frames (resulting in generation of duplication of RTP packets conveying I-frames) while P-frames and B-frames may be considered less important frames (resulting in pass-through, without duplication, of RTP packets conveying P-frames and B-frames). An exemplary embodiment in which selective packet duplication is performed using packet importance is depicted and described herein with respect to FIG. 3 and FIG. 4. An exemplary embodiment in which selective error correction strengthening is performed using packet importance is depicted and described herein with respect to FIG. 5, FIG. 6, and FIG. 7.

Figure 3:
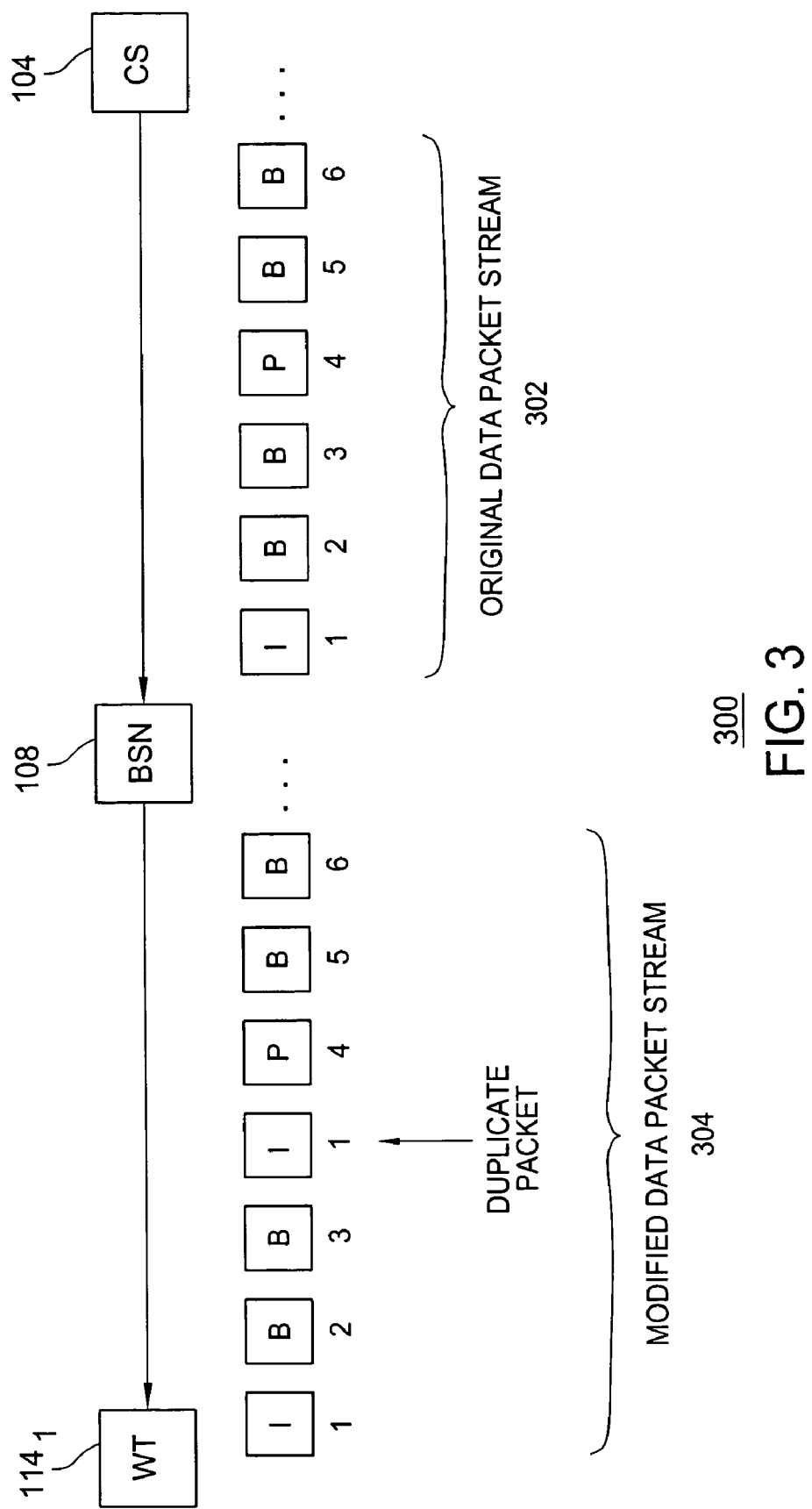
FIG. 3 depicts a high-level block diagram of a portion of the communication network of FIG. 1 in which each data packet satisfying an importance condition is duplicated for transmission toward a wireless terminal.

FIG. 3 depicts a high-level block diagram of a portion of the communication network of FIG. 1 in which each data packet satisfying an importance condition is duplicated for transmission toward a wireless terminal. As depicted in FIG. 3, CS 104 transmits an original data packet stream 302 to BSN 108. The original data packet stream 302 includes a plurality of data packets including a respective plurality of MPEG frames conveying media content. As depicted in FIG. 3, original data packet stream 302 includes a plurality of data packets transporting the following sequence of MPEG frames: I-frame, B-frame, B-frame, P-frame, B-frame, B-frame, where each packet in original data packet transport stream 302 includes a packet header including an associated sequence number: 1, 2, 3, 4, 5, 6, respectively.

The BSN 108 processes each data packet in original data packet stream 302 for determining whether to duplicate the data packet. In one embodiment, the determination as to whether to duplicate a data packet is performed according to at least one packet characteristic. In one embodiment, the determination as to whether to duplicate a data packet is performed according to an importance level associated with the data packet. As depicted in FIG. 3, since data packets transporting I-frames are deemed to be important data packets, BSN 108 duplicates each data packet identified as transporting an I-frame. As depicted in FIG. 3, since only the first data packet in the depicted portion of original data packet stream 302 (i.e., packet with sequence number equal to one) transports an I-frame, only the first data packet in the depicted portion of original data packet stream 302 is duplicated.

As depicted in FIG. 3, BSN 108 inserts the duplicate data packet in original data packet stream 302 to form a modified data packet stream 304. As depicted in FIG. 3, modified data packet stream 304 includes a plurality of data packets transporting the following sequence of MPEG frames: I-frame (original), B-frame, B-frame, I-frame (duplicate), P-frame, B-frame, B-frame, where each data packet has a packet header including an associated sequence number 1, 2, 3, 1, 4, 5, 6, respectively. As depicted in FIG. 3, the duplicate data packet is inserted between the third and fourth data packets of original data packet stream 302. In one embodiment, insertion of duplicate packets in original data packet stream 302 to form modified data packet stream 304 may be performed according to various conditions.

In one embodiment, in order to avoid packet losses and corruptions, a duplicate data packet is inserted into an original data packet stream within a packet insertion window. In one embodiment, the size of the packet insertion window is measured from the location, within the original data packet stream, of the original data packet from which the duplicate data packet is generated. In one embodiment, a duplicate data packet must be inserted within X packet positions of the original data packet from which the duplicate data packet is generated. In one such embodiment, packet positions may be tracked using the respective sequence numbers of the data packets. As depicted in FIG. 3, for example, the duplicate data packet (sequence number one) is inserted three packet positions from the original data packet (sequence number one). In one embodiment, the size of the packet insertion window is configurable.

The BSN 108 multicasts modified data packet stream 304 to WT 114$_1$ (as well as any other WTs 114 belonging to the media group associated with modified data packet stream 304). The WT 114$_1$ processes modified data packet stream 304 for forming a presentation stream adapted for use by WT 114$_1$ in presenting content conveyed by modified data packet stream 304. If an original data packet transporting original content is successfully received and processed by WT 114$_1$, an associated duplicate packet transporting duplicate content is discarded since it is not required for presenting the media content. If an original data packet transporting original content is not successfully received and processed by WT 114$_1$, an associated duplicate packet transporting duplicate content is processed for inclusion in the presentation stream for presenting the media content.

Figure 4:
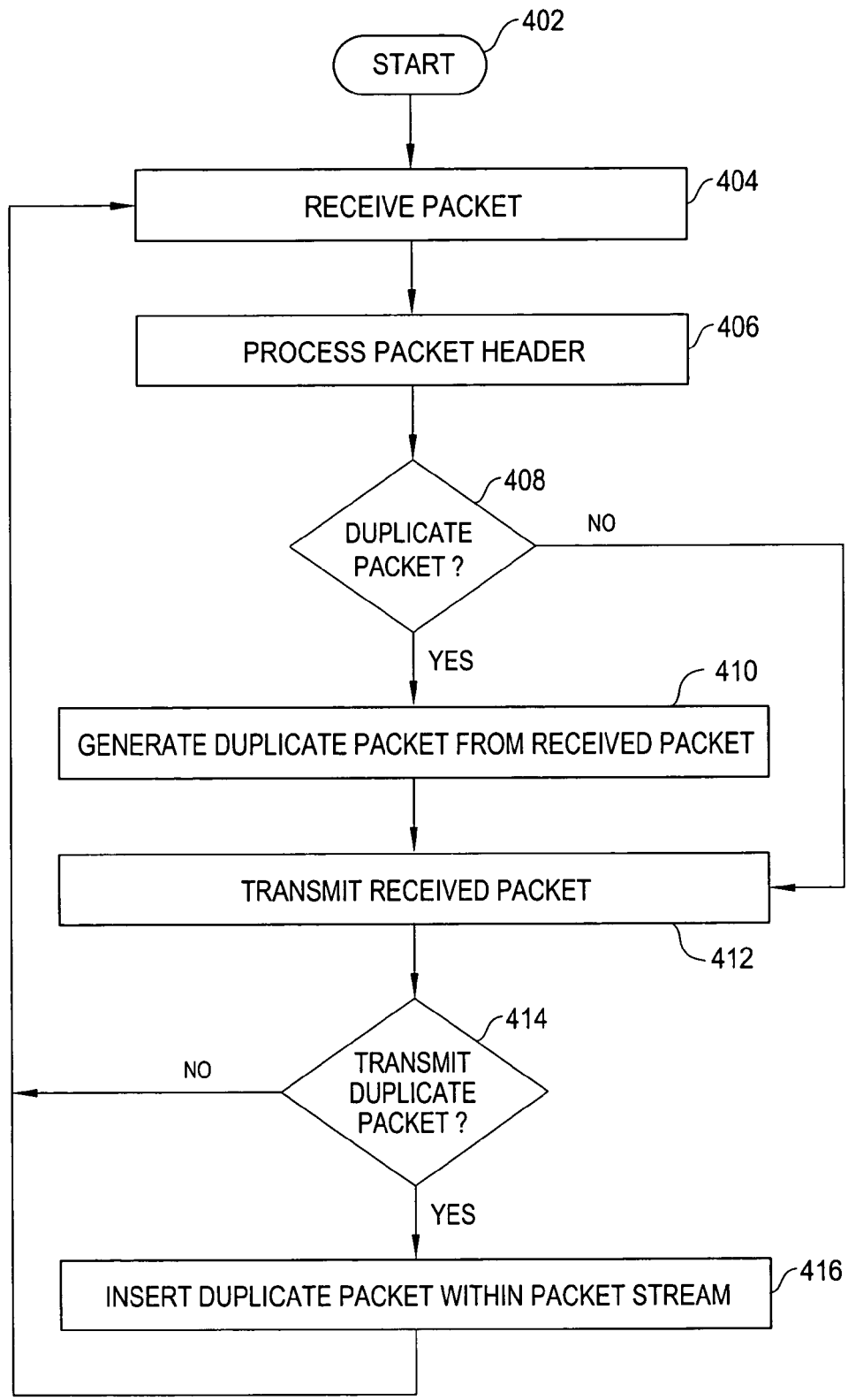
FIG. 4 depicts a method according to one embodiment of the present invention.

FIG. 4 depicts a method according to one embodiment of the present invention. Specifically, method 400 of FIG. 4 includes a method for duplicating important data packets of a data packet stream conveying multimedia content from a content server to a wireless terminal. Although depicted and described with respect to one data packet stream, those skilled in the art will appreciate that method 400 of FIG. 4 may be performed for a plurality of data packet streams. Although depicted and described as being performed serially, those skilled in the art will appreciate that at least a portion of the steps of method 400 may be performed contemporaneously, or in a different order that presented in FIG. 4. The method 400 begins at step 402 and proceeds to step 404.

At step 404, a data packet is received. At step 406, a packet header of the received data packet is processed. At step 408, a determination is made as to whether to duplicate the received data packet. If the received data packet is not duplicated, method 400 proceeds to step 412. If the received data packet is duplicated, method 400 proceeds to step 410. At step 410, a duplicate data packet is generated from the received data packet. In one embodiment, a duplicate data packet is identified as a duplicate data packet using a sequence number field in the header of the duplicate data packet (i.e., the duplicate data packet and the original data packet from which the duplicate data packet is generated have identical sequence numbers).

In one embodiment, the determination as to whether a data packet is duplicated is performed according to at least one packet characteristic. In one embodiment, the determination as to whether a data packet is duplicated is performed using at least one packet parameter. In one such embodiment, the determination as to whether a data packet is duplicated is performed using an associated packet importance level. In one embodiment, packet importance level may be determined using at least one packet parameter (e.g., transported frame type, transported frame importance level, and the like, as well as various combinations thereof). In one embodiment, for example, each packet transporting a particular frame type (e.g., I-frame) is duplicated. In one embodiment, for example, each data packet transporting a frame having a particular frame importance level (e.g., I-frames) is duplicated.

In one embodiment, for example, in which RTP packets transport respective MPEG-4 frames, a random access point (RAP) flag field included within each RTP packet header may be processed for determining whether the RTP packet is duplicated (or allowed to pass through without duplication). In one embodiment, for example, in which RTP packets transport respective H.264 frames, a network abstraction layer (NAL) reference indicator (NRI) field included within each RTP packet header may be processed for determining whether the RTP packet is duplicated (or allowed to pass through without duplication). In one such embodiment, since a highest NRI value indicates inclusion of an I-frame within the payload of the associated packet, RTP packets having the highest NRI value may be duplicated.

In one embodiment, a duplicate data packet may be inserted into a data packet stream within a packet insertion window having an associated packet insertion window size. In one embodiment, duplicate data packets may be inserted into data packet stream randomly such that the duplicate data packet is scattered within the packet insertion window. In one embodiment, packet insertion window size is preconfigured. In one embodiment, packet insertion window size is dynamically configurable. In one embodiment, packet insertion window size is set according to a playback buffer size (i.e., the size of the playback buffer on a wireless terminal to which the data packet stream is conveyed). In one such embodiment, packet insertion window size is approximately equal to playback buffer size.

In one embodiment, packet insertion window size may be managed according to respective packet positions of data packets within a data packet stream. In one embodiment, each duplicate data packet is inserted into the data packet stream in a packet position that is below a threshold number of packet positions from the packet position of the original data packet from which the duplicate data packet is generated (e.g., a duplicate data packet is inserted no more than 100 packet positions from an original data packet from which the duplicate packet is generated). In one embodiment, packet position may be managed according to sequence numbers of data packets within the data packet stream. Although described with respect to specific window size management methods, various other window size management methods may be used for inserting duplicate data packets within a data packet stream.

At step 412, the received data packet is transmitted. In one embodiment, the received data packet is transmitted toward at least one wireless terminal using an associated radio access network. At step 414, a determination is made as to whether a duplicate data packet is transmitted. If a duplicate data packet is not transmitted, method 400 returns to step 404, at which point the next data packet in the data packet stream is received and processed. If a duplicate data packet is transmitted, method 400 proceeds to step 416. At step 416, a duplicate data packet is inserted within the data packet stream. From step 416, method 400 returns to step 404, at which point the next data packet in the data packet stream is received and processed.

In one embodiment, a determination is made as to whether the most recently generated duplicate data packet is transmitted. In one embodiment, since duplicate data packets may be scattered within the data packet stream, a determination may be made as to whether a previously generated duplicate data packet is transmitted. For example, as depicted with respect to FIG. 3, following a determination that data packet three is not duplicated (since data packet three is identified as transporting a B-frame), a determination may be made as to whether the duplicate data packet one is inserted in the data packet stream following transmission of data packet three and prior to transmission of data packet four. In this example, as depicted in FIG. 3, duplicate data packet one is inserted between data packet three and data packet four in the data packet stream multicast from BSN 108 to WT $114_1$.

Figure 5:
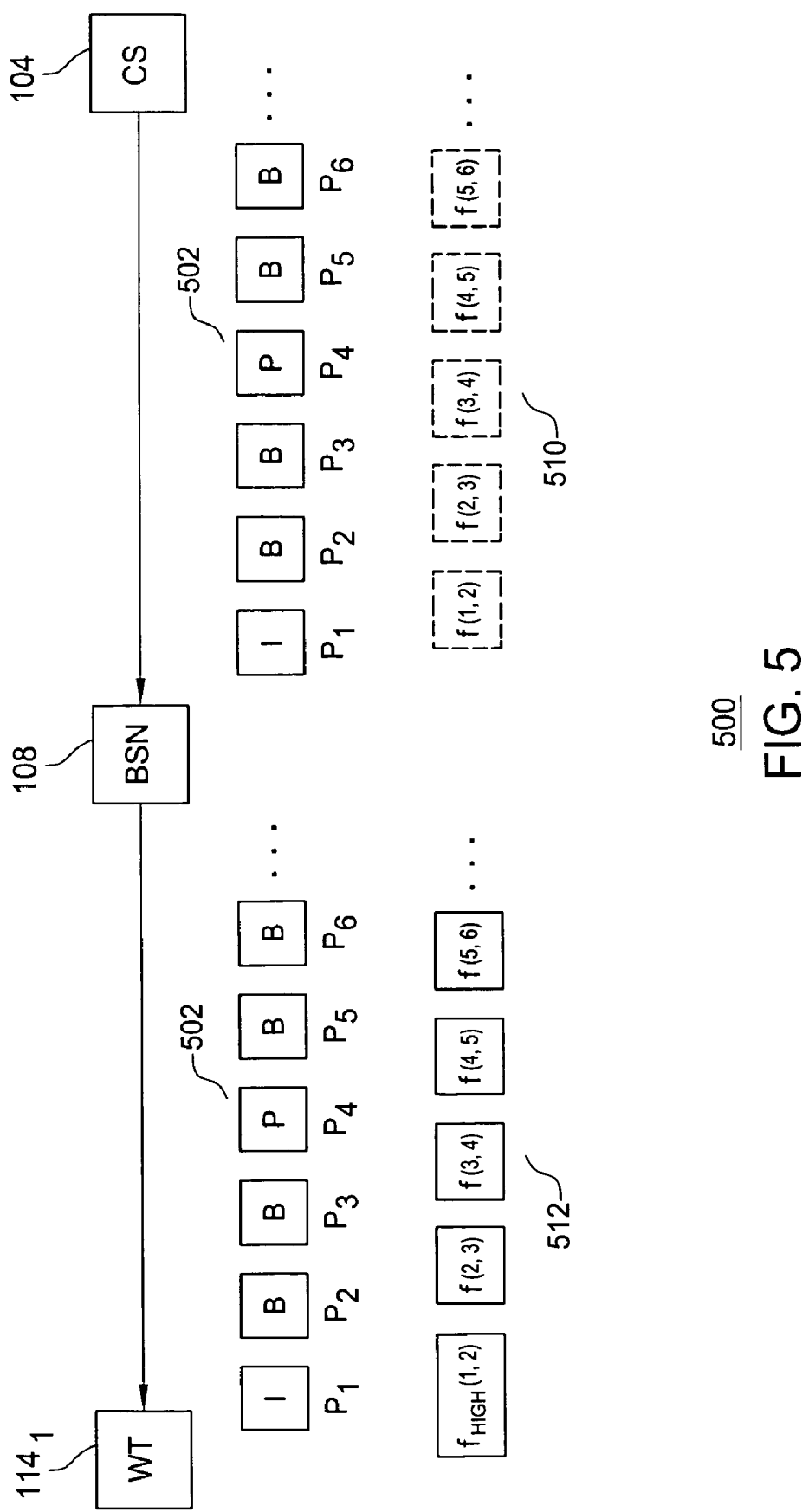
FIG. 5 depicts a high-level block diagram of a portion of the communication network of FIG. 1 in which an error correction strength of each error correction packet associated with a data packet satisfying an importance condition is enhanced for transmission toward a wireless terminal.

FIG. 5 depicts a high-level block diagram of a portion of the communication network of FIG. 1 in which an error correction strength of each error correction packet associated with a data packet satisfying an importance condition is enhanced for transmission toward a wireless terminal. As depicted in FIG. 5, CS 104 transmits data packet stream 502 to BSN 108, and BSN 108 transmits data packet stream 502 to WT $114_1$. The data packet stream 502 includes a plurality of data packets including a respective plurality of MPEG frames conveying media content. As depicted in FIG. 5, data packet stream 502 includes a plurality of data packets (denoted as $P_1$ through $P_6$) transporting the following sequence of MPEG frames: I-frame, B-frame, B-frame, P-frame, B-frame, B-frame, where each data packet in data packet stream 502 includes a packet header including an associated sequence number: 1, 2, 3, 4, 5, 6, respectively.

As depicted in FIG. 5, in one embodiment, CS 104 does not provide error correction functionality, and, thus does not transmit an error correction packet stream to BSN 108. As depicted in FIG. 5, in another embodiment, CS 104 optionally transmits an original error correction packet stream 510 to BSN 108. The original error correction packet stream 510 includes error correction packets generated using information from pairs of consecutive data packets of data packet stream 502. As depicted in FIG. 5, original error correction packet stream 510 includes a first error correction packet (f(1,2)) generated using data packets $P_1$ and $P_2$, a second error correction packet (f(2,3)) generated using data packets $P_2$ and $P_3$, a third error correction packet (f(3,4)) generated using data packets $P_3$ and $P_4$, a fourth error correction packet (f(4,5)) generated using data packets $P_4$ and $P_5$, and a fifth error correction packet (f(5,6)) generated using data packets $P_5$ and $P_6$.

As depicted in FIG. 5, BSN 108 forms an enhanced error correction packet stream 512. In one embodiment, in which CS 104 does not transmit original error correction packet stream 510 to BSN 108, BSN 108 produces enhanced error correction packet stream 512 by generating each of the error correction packets of enhanced error correction packet stream 512. In one embodiment, in which CS 104 transmits original error correction packet stream 510 to BSN 108, BSN 108 produces enhanced error correction packet stream 512 by modifying at least a portion of the error correction packets of original error correction packet stream 510. In such embodiments, BSN 108 forms the enhanced error correction packet stream 512 by processing data packets from associated data packet stream 502 (e.g., for identifying data packets satisfying an importance condition).

In one embodiment, in which CS 104 does not transmit original error correction packet stream 510 to BSN 108, BSN 108 generates enhanced error correction packet stream 512. In one embodiment, in which BSN 108 generates enhanced error correction packet stream 512, for each pair of consecutive data packets in data packet stream 502, BSN 108 generates an associated error correction packet in enhanced error correction packet stream 512. In one embodiment, for each data packet in data packet stream 502 having an associated importance level not satisfying an importance condition BSN 108 generates a standard error correction packet, and for each data packet in data packet stream 502 having an associated importance level satisfying an importance condition BSN 108 generates an enhanced error correction packet.

In one embodiment, in which CS 104 transmits original error correction packet stream 510 to BSN 108, BSN 108 modifies original error correction packet stream 510 to form enhanced error correction packet stream 512. In one embodiment, in which BSN 108 modifies original error correction packet stream 510 to form enhanced error correction packet stream 512, for each data packet in data packet stream 502 having an associated importance level satisfying an importance threshold, BSN 108 identifies at least one associated error correction packet in original error correction packet stream 510. The BSN 108 modifies the identified error correction packet from original error correction packet stream 510 in a manner for increasing the error correction strength of the identified error correction packet, thereby forming enhanced error correction packet stream 512.

In this embodiment, for each pair of consecutive data packets in data packet stream 502 including a data packet having an associated importance level satisfying an importance threshold (e.g., I-frames), BSN 108 produces (i.e., generates new or modifies existing) an error correction packet having a first error correction strength, and, for each pair of consecutive data packets in data packet stream 502 including a data packet having an associated importance level not satisfying the importance threshold (e.g., B-frames, P-frames), BSN 108 produces (i.e., generates new or modifies existing) an error correction packet having a second error correction strength. In one such embodiment, the first error correction strength is greater than the second error correction strength.

As depicted in FIG. 5, since packets transporting I-frames are deemed to be important packets (i.e., packets satisfying an importance condition), BSN 108 produces enhanced error correction packets for each consecutive data packet pair including a data packet transporting an I-frame. As depicted in FIG. 5, since only the first data packet $P_1$ in the depicted portion of data packet stream 502 (i.e., data packet with sequence number of one) transports an I-frame, only the first error correction packet in the depicted portion of enhanced error correction packet stream 512 is produced (i.e., generated or modified) with an increased error correction strength (denoted as $f_{HIGH}(1,2)$). As depicted in FIG. 5, since other data packets in data packet stream 502 include B-frames and P-frames, other error correction packets in enhanced error correction packet stream 512 (illustratively, error correction packets f(2,3), f(3,4), f(4,5), and f(5,6)) comprise standard error correction strength.

The BSN 108 multicasts data packet stream 502 to WT $114_1$ (as well as any other WTs 114 belonging to the multicast group associated with data packet stream 502). The BSN 108 multicasts enhanced error correction packet stream 512 to WT $114_1$ (as well as any other WTs 114 belonging to the multicast group associated with enhanced error correction packet stream 512). In one embodiment, data packet stream 502 and enhanced error correction packet stream 512 may share a multicast group. The WT $114_1$ processes data packet stream 502 for forming a presentation stream adapted for use by WT $114_1$ in presenting content conveyed by data packet stream 502. The WT $114_1$ processes enhanced error correction packet stream 512 for detecting and correcting errors in data packet stream 502. For example, WT $114_1$ may process enhanced error correction packets f(1,2) and f(2,3) for detecting and correcting errors in data packet $P_2$.

Figure 6:
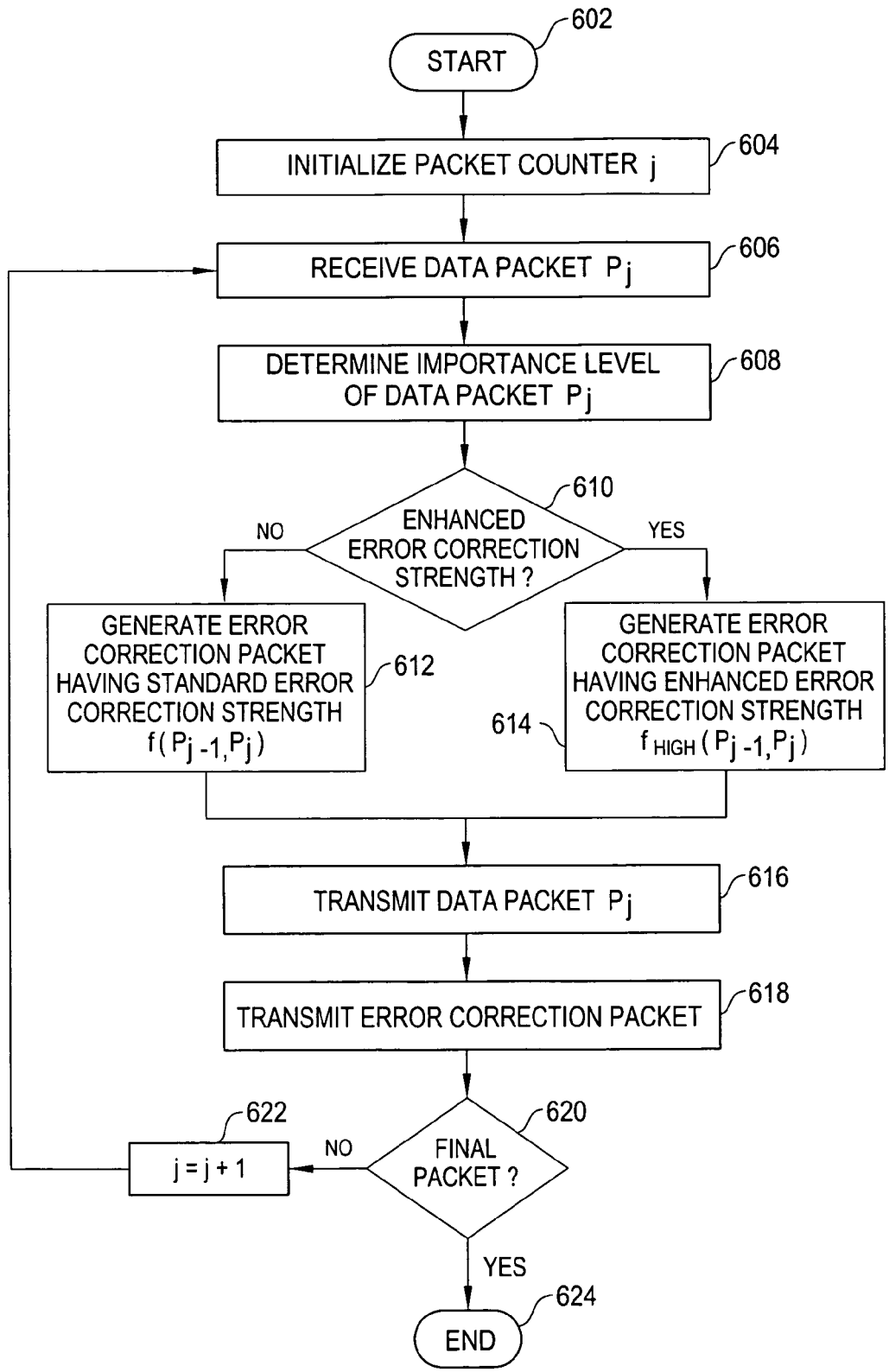
FIG. 6 depicts a method according to one embodiment of the present invention.

FIG. 6 depicts a method according to one embodiment of the present invention. Specifically, method 600 of FIG. 6 includes a method for generating an error correction packet stream associated with a data packet stream, where a portion of the error correction packets of the error correction packet stream include enhanced error correction strength. Although depicted and described as being performed serially, those skilled in the art will appreciate that at least a portion of the steps of method 600 may be performed contemporaneously, or in a different order than presented in FIG. 6. The method 600 begins at step 602 and proceeds to step 604.

At step 604, a packet counter (denoted as j) is initialized. In one embodiment, packet counter j may be initialized to one j(=1). At step 606, a data packet $P_j$ is received. At step 608, an importance level of data packet $P_j$ is determined. In one embodiment, importance level is determined according to at least one characteristic of data packet $P_j$. In one embodiment, importance level is determined using at least one parameter of data packet $P_j$. In one such embodiment, importance level may be determined using at least one header parameter of data packet $P_j$ (e.g., transported frame type (e.g., I-frame, B-frame, or P-frame), transported frame importance level, and the like, as well as various combinations thereof).

At step 610, a determination is made as to whether enhanced error correction strength is applied for data packet $P_j$ (i.e., whether enhanced error correction strength is applied to an error correction packet generated for corresponding data packet $P_j$). In one embodiment, the determination as to whether enhanced error correction strength is applied is performed using the determined importance level of data packet $P_j$. In one embodiment, for example, a determination may be made to apply enhanced error correction strength for each data packet transporting a particular frame type (e.g., for each data packet transporting an I-frame). If enhanced error correction strength is required, method 600 proceeds to step 614. If enhanced error correction strength is not required, method 600 proceeds to step 612.

At step 612, an error correction packet having standard error correction strength is generated for previous data packet $P_{j-1}$ and current data packet $P_j$ (denoted as $f(P_{j-1},P_j)$). In one such embodiment, error correction packet $f(P_{j-1},P_j)$ having standard error correction strength is generated using information from previous data packet $P_{j-1}$ and current data packet $P_j$. At step 614, an error correction packet having enhanced error correction strength is generated for previous data packet $P_{j-1}$ and current data packet $P_j$ (denoted as $f_{HIGH}(P_{j-1},P_j)$). In one such embodiment, error correction packet $f_{HIGH}(P_{j-1},P_j)$ having enhanced error correction strength is generated using information from previous data packet $P_{j-1}$ and current data packet $P_j$. From steps 612 and 614, method 600 proceeds to step 616.

Although omitted for purposes of clarity, in one embodiment, error correction strength processing begins with the second packet in the received data packet stream (i.e., two data packets must be received before an associated error correction packet may be generated). Although not depicted, in one embodiment, an error correction packet (having standard or enhanced error correction strength) may be generated for current data packet $P_j$ and subsequent data packet $P_{j+1}$ (e.g., $f(P_j,P_{j+1})$ or $f_{HIGH}(P_j,P_{j+1})$, respectively). Although primarily depicted and described herein with respect to using a pair of consecutive data packets for producing an error correction packet, in one embodiment, an error correction packet may be produced using one data packet, two non-consecutive data packets, three consecutive data packets, and the like.

At step 616, data packet $P_j$ is transmitted. In one embodiment, data packet $P_j$ is transmitted to at least one wireless terminal using a multicast group. At step 618, error correction packet ($f(P_{j-1},P_j)$ or $f_{HIGH}(P_{j-1},P_j)$) is transmitted. In one embodiment, the error correction packet is transmitted to at least one wireless terminal using a multicast group. At step 620, a determination is made as to whether the final packet in the data packet stream has been processed. If the final packet in the data packet stream has not been processed, method 600 proceeds to step 622. At step 622, packet counter j is incremented (i.e., j=j+1). From step 622, method 600 returns to step 606, at which point the next data packet $P_j$ is received. If the final packet in the data packet stream has been processed, method 600 proceeds to step 624. At step 624, method 600 ends.

Figure 7:
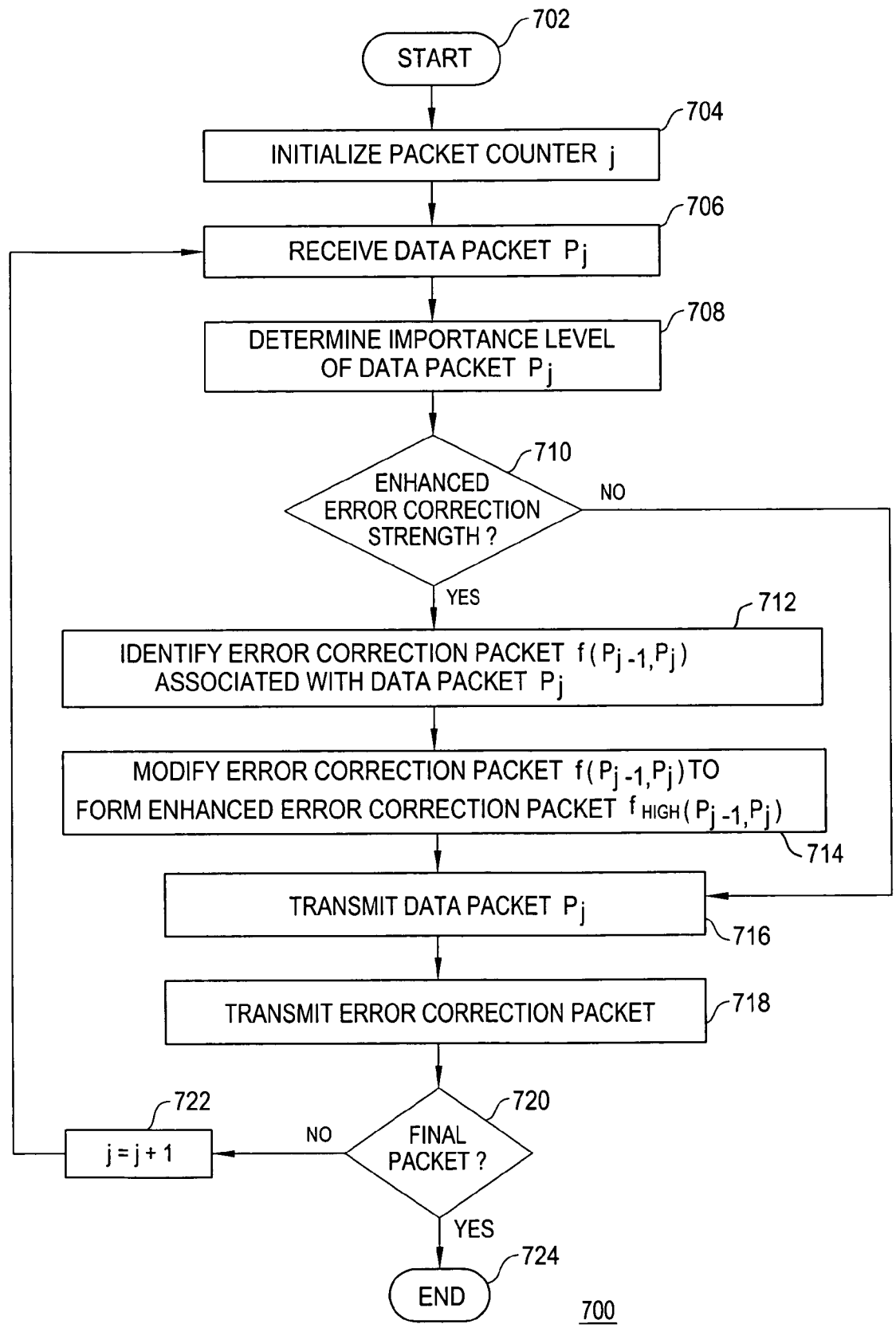
FIG. 7 depicts a method according to one embodiment of the present invention.

FIG. 7 depicts a method according to one embodiment of the present invention. Specifically, method 700 of FIG. 7 includes a method for modifying an original error correction packet stream to form an enhanced error correction packet stream. Although omitted for purposes of clarity (since orderings of arrivals of data packets and associated error correction packets may vary), original error correction packets, associated with corresponding data packets, are processed to form enhanced error correction packets. Although depicted and described as being performed serially, those skilled in the art will appreciate that at least a portion of the steps of method 700 may be performed contemporaneously, or in a different order than presented in FIG. 7. The method 700 begins at step 702 and proceeds to step 704.

At step 704, a packet counter (denoted as j) is initialized (e.g., to one (j=1)). At step 706, a data packet $P_j$ is received. At step 708, an importance level of data packet $P_j$ is determined. At step 710, a determination is made as to whether enhanced error correction strength is applied. In one embodiment, the determination as to whether enhanced error correction strength is applied is performed using the importance level of data packet $P_j$. In one embodiment, for example, a determination may be made to apply enhanced error correction strength to each error correction packet associated with each data packet transporting a particular frame type (e.g., data packets transporting I-frames). If enhanced error correction strength is not required, method 700 proceeds to step 716. If enhanced error correction strength is required, method 700 proceeds to step 712.

At step 712, original error correction packets $f(P_{j-1},P_j)$ and $f(P_j,P_{j+1})$ associated with data packet Pj are identified. At step 714, error correction packets $f(P_{j-1},P_j)$ and $f(P_j,P_{j+1})$ associated with data packet $P_j$ are modified to form enhanced error correction packets $f_{HIGH}(P_{j-1},P_j)$ and $f_{HIGH}(P_j,P_{j+1})$, respectively. At step 716, data packet $P_j$ is transmitted. In one embodiment, data packet $P_j$ is transmitted to at least one wireless terminal using a multicast group. At step 718, the error correction packets associated with data packet $P_j$ (e.g., either $[f(P_{j-1},P_j)$ and $f(P_j,P_{j+1})]$ or $[f_{HIGH}(P_{j-1},P_j)$ and $f_{HIGH}(P_j,P_{j+1})]$) are transmitted. In one embodiment, error correction packets are transmitted to at least one wireless terminal using a multicast group. In one embodiment, transmission of an error correction packet may be contemporaneous with transmission of an associated data packet.

At step 720, a determination is made as to whether the final packet in the data packet stream has been processed. If the final packet in the data packet stream has not been processed, method 700 proceeds to step 722. At step 722, packet counter j is incremented (i.e., j=j+1). From step 722, method 700 returns to step 706, at which point the next data packet $P_j$ is received. If the final packet in the data packet stream has been processed, method 700 proceeds to step 724. At step 724, method 700 ends. Although primarily described herein with respect to using a pair of consecutive data packets for producing an error correction packet, in one embodiment, an error correction packet may be produced using one data packet, two non-consecutive data packets, three consecutive data packets, and the like.

Figure 8:
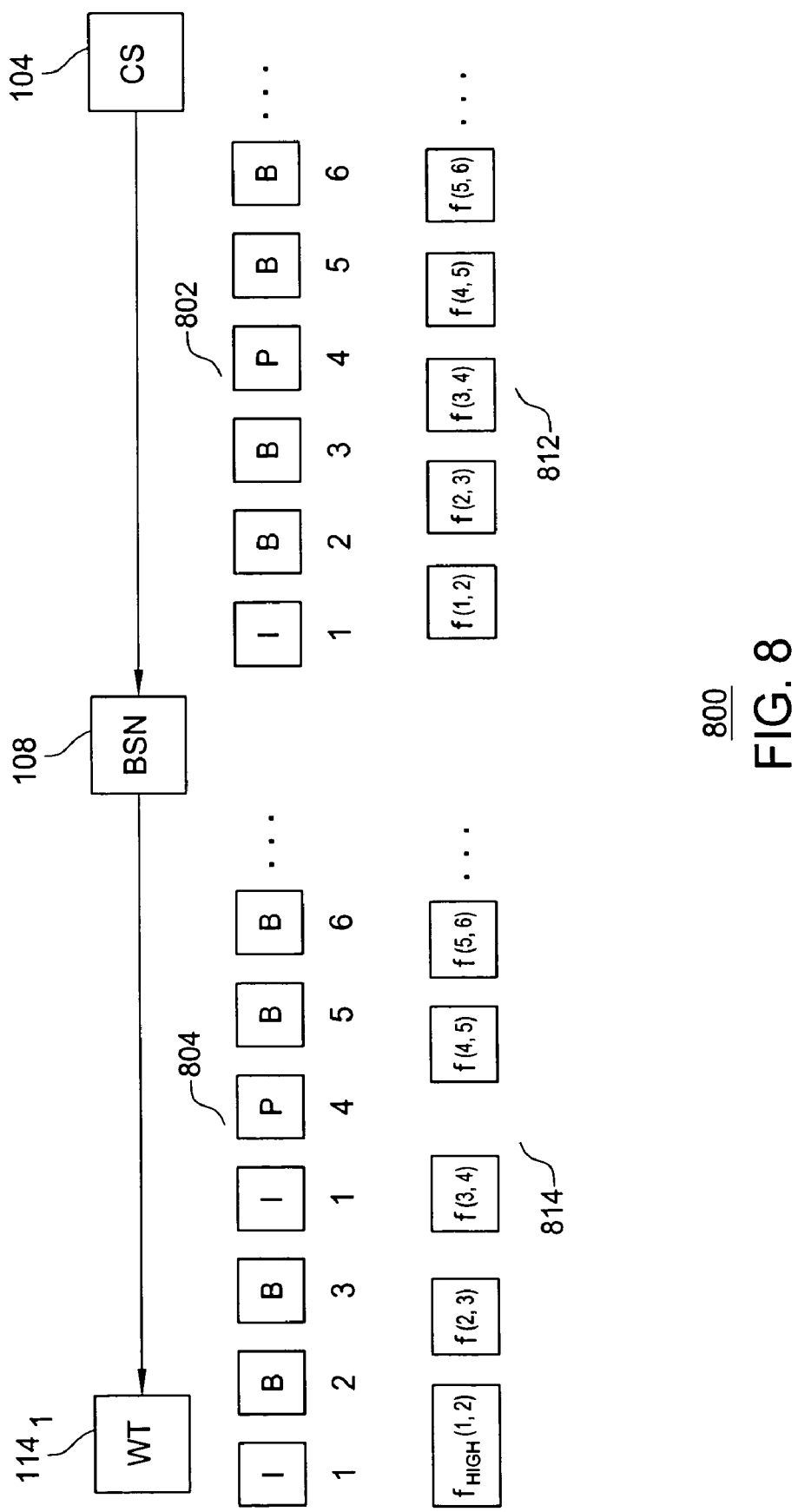
FIG. 8 depicts a high-level block diagram of a portion of the communication network of FIG. 1 in which selective data packet duplication and selective error correction strengthening are utilized for improving transport reliability.

FIG. 8 depicts a high-level block diagram of a portion of the communication network of FIG. 1 in which a combination of selective data packet duplication and selective error correction strengthening is utilized for improving transport reliability. Although primarily depicted and described herein as distinct processes, as depicted in FIG. 8, in one embodiment, data packets may be duplicated according to associated importance level of the data packets and, furthermore, error correction packets having enhanced error correction strength may be produced according to associated importance level of the data packets. As depicted in FIG. 8, in one such embodiment, in which a portion of the data packets conveying media content are duplicated, corresponding error correction packets are not formed for combinations of duplicate data packets and adjacent original data packets.

As depicted in FIG. 8, BSN 108 receives an original data packet stream 802 and transmits an associated modified data packet stream 804. In one embodiment, processing of original data packet stream 802 to produce modified data packet stream 804 is performed in a manner depicted and described herein with respect to FIG. 3 and FIG. 4. As depicted in FIG. 8, BSN 108 receives an original error correction packet stream 812 and transmits an associated enhanced error correction packet stream 814. In one embodiment, processing of original error correction packet stream 812 to produce enhanced error correction packet stream 814 is performed in a manner depicted and described herein with respect to FIG. 5 and one of FIG. 6 or FIG. 7.

Figure 9:
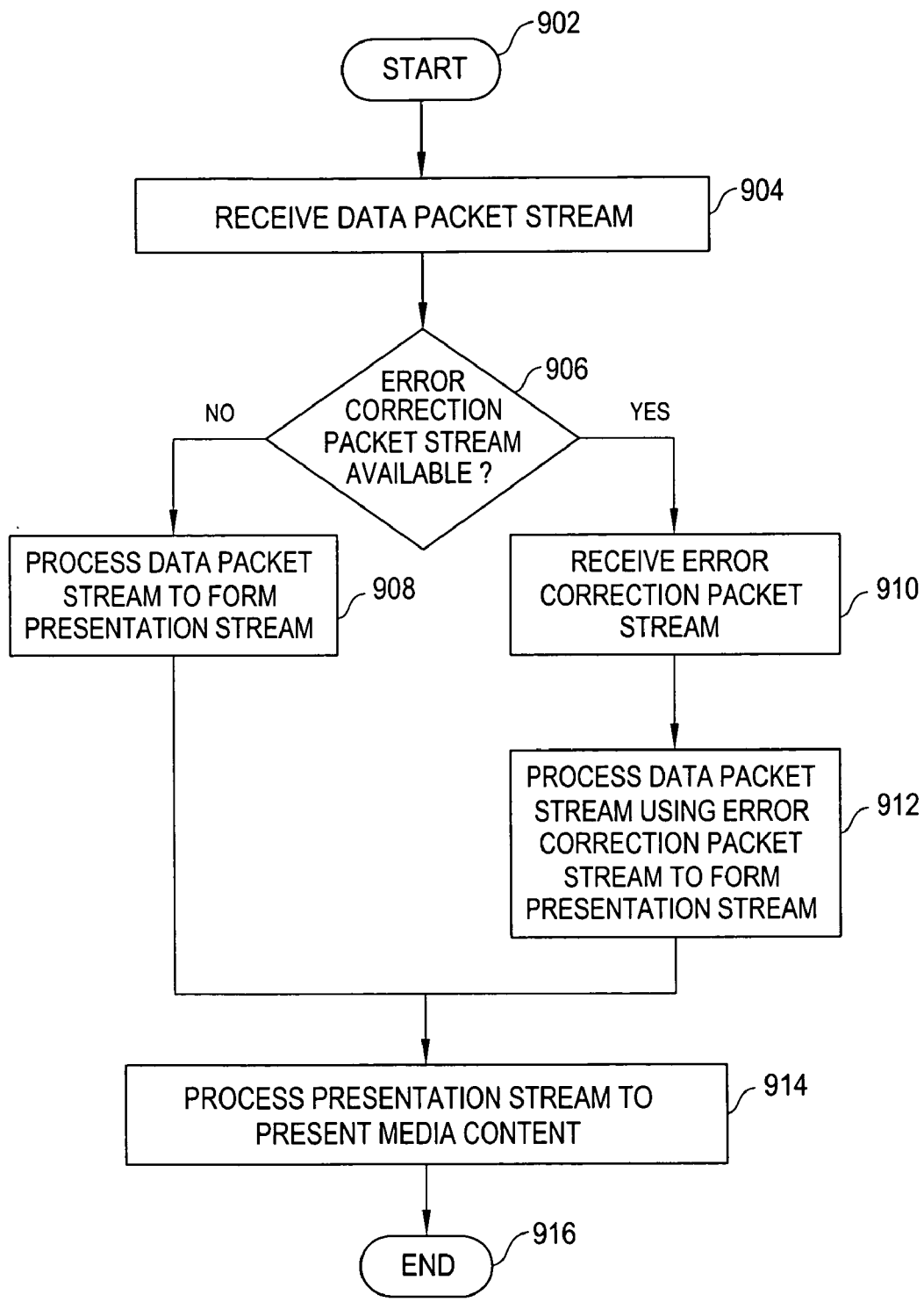
FIG. 9 depicts a method according to one embodiment of the present invention.

FIG. 9 depicts a method according to one embodiment of the present invention. Specifically, method 900 of FIG. 9 includes a method for presenting media content on a presentation device. Although described with respect to an embodiment in which packet duplication and error correction enhancement are utilized together, those skilled in the art will appreciate that method 900 of FIG. 9 may be adapted for presenting media content in the absence of error correction enhancement, as well as in the absence of any error correction packet stream. Although depicted and described as being performed serially, those skilled in the art will appreciate that at least a portion of the steps of method 900 may be performed contemporaneously, or in a different order than presented in FIG. 9. The method begins at step 902 and proceeds to step 904.

At step 904, a data packet stream is received. In one embodiment, the data packet stream comprises an unmodified data packet stream (i.e., not including duplicate data packets). In one embodiment, the data packet stream comprises a modified data packet stream including at least one duplicate packet duplicated using at least one packet duplication method described herein. At step 906, a determination is made as to whether an error correction packet stream is available. If an error correction packet stream is available, method 900 proceeds to step 910. If an error correction packet stream is not available, method 900 proceeds to step 908.

At step 908, the data packet stream is processed to form a presentation stream adapted for use in presenting media content. In one embodiment, each packet in the data packet stream is processed according to a packet order determined according to a sequence number associated with each packet in the data packet stream. In one embodiment, in which the data packet stream is a modified data packet stream having at least one duplicate data packet, if an original packet of the modified data packet stream is missing or corrupted, the associated duplicate packet formed from the respective original packet may be processed for inclusion within the presentation stream. From step 908, method 900 proceeds to step 914.

At step 910, an error correction packet stream is received. In one embodiment, the error correction packet stream comprises an unmodified, standard error correction packet stream (i.e., not including error correction packets having increased error correction strength). In one embodiment, the error correction packet stream comprises an enhance error correction packet stream including at least one enhanced error correction packet having increased error correction strength. In one such embodiment, the enhance error correction packet stream may be formed using at least one error correction strengthening method described herein.

At step 912, the data packet stream is processed using the error correction packet stream to form a presentation stream adapted for use in presenting media content. In one embodiment, each packet in the data packet stream is processed according to a packet order determined according to a sequence number associated with each packet in the data packet stream. In one embodiment, in which one or more bits of a data packet are corrupted, the associated error correction packet(s) from the received error correction packet stream may be processed for correcting the corrupted bit(s). In one embodiment, if an original packet of the modified data packet stream is missing or corrupted, a duplicate packet formed from the respective original packet may be processed for inclusion within the presentation stream. From step 912, method 900 proceeds to step 914.

At step 914, the presentation stream is processed for presenting media content conveyed by the data packet stream. In one embodiment, using various combinations of packet duplication and error correction strengthening described herein, quality of the media content conveyed by the presentation stream is improved. As described herein, the presentation stream may be processed for presenting the media content using any presentation device (e.g., a display screen of a mobile phone, a display screen of a laptop, a display screen of a television, and the like, as well as various combinations thereof). The method 900 then proceeds to step 916, where method 900 ends.

Figure 10:
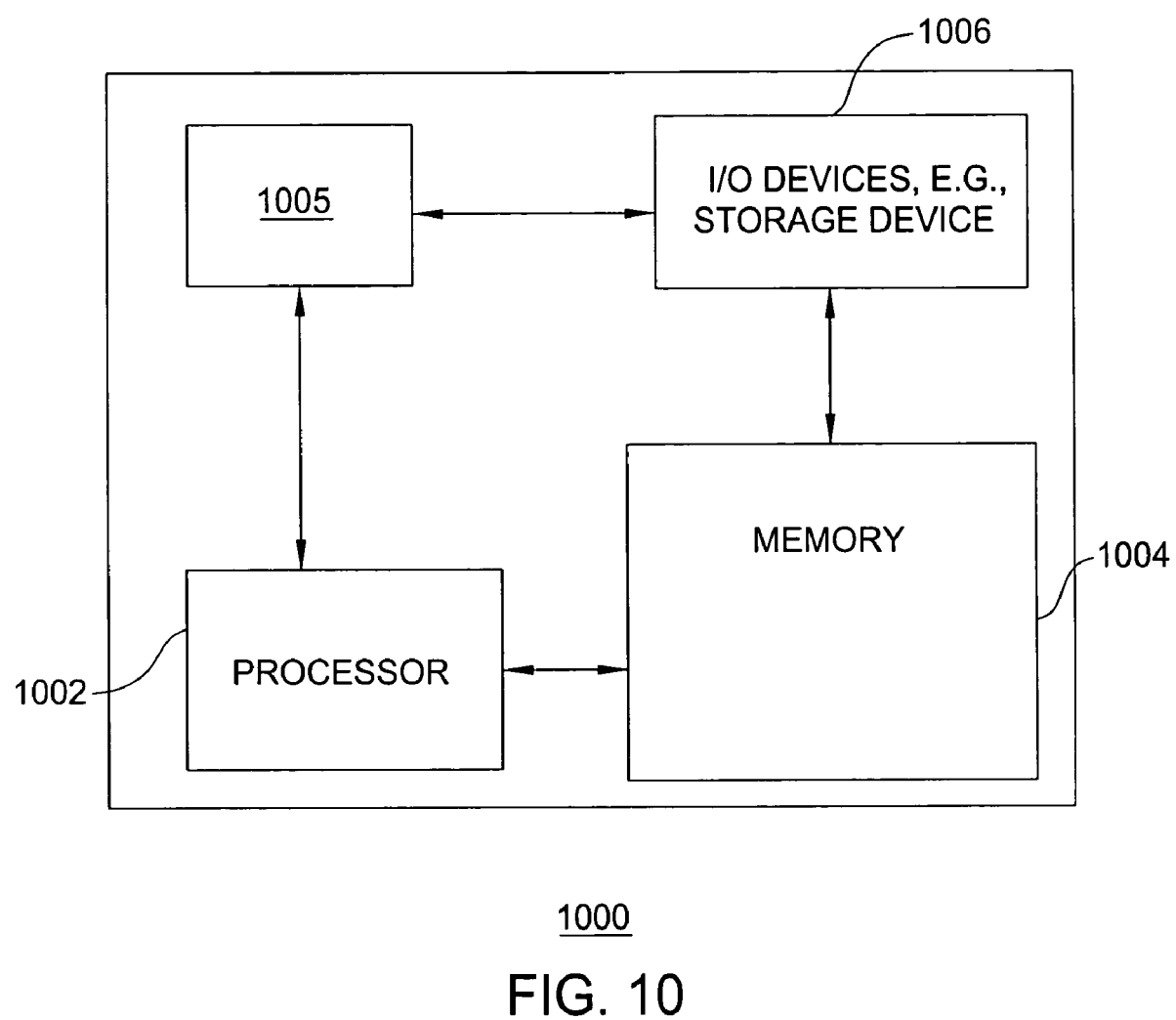
FIG. 10 depicts a high-level block diagram of a general-purpose computer suitable for use in performing the functions described herein.

FIG. 10 depicts a high-level block diagram of a general-purpose computer suitable for use in performing the functions described herein. As depicted in FIG. 10, system 1000 comprises a processor element 1002 (e.g., a CPU), a memory 1004, e.g., random access memory (RAM) and/or read only memory (ROM), a transport reliability control module 1005, and various input/output devices 1006 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present transport reliability control process 1005 can be loaded into memory 1004 and executed by processor 1002 to implement the functions as discussed above. As such, transport reliability control process 1005 (including associated data structures) of the present invention can be stored on a computer readable medium or carrier, e.g., RAM memory, magnetic or optical drive or diskette and the like.

Although primarily depicted and described herein with respect to a system transporting MPEG-based content, the present invention may be used for transporting any content with increased transport reliability. Although primarily depicted and described herein with respect to specific packet duplication and insertion processing, other packet duplication and insertion processing may be used in accordance with the present invention. Although primarily depicted and described herein with respect to a specific implementation of forward error correction, various other implementations of forward error correction, as well as various other error correction schemes may be used in accordance with the present invention.

Although primarily depicted and described herein with respect to a 3GPP2 CDMA2000 1×RTT network in which a BSN performs media stream buffering for bridging a mismatch in media bit rate and media transmission rate, in one embodiment, media stream buffering may be performed by other network elements within 3GPP2 CDMA2000 networks, within other 3GPP2 CDMA2000 networks (e.g., EvDO, HRPD, and the like), within other 3G networks (e.g., 3GPP UMTS networks), within other wireless-based networks, and the like, as well as various combinations thereof. For example, in one embodiment, at least a portion of the functions of the present invention depicted and described herein with respect to BSNs may be performed by Gateway GPRS Support Nodes (GGSNs) in 3GPP UMTS networks.

Although various embodiments which incorporate the teachings of the present invention have been shown and described in detail herein, those skilled in the art can readily devise many other varied embodiments that still incorporate these teachings.

What is claimed is:

1. A method for providing media content, comprising:
    identifying, in an original packet stream comprising a plurality of data packets conveying media content, a data packet for which an associated importance level satisfies an importance condition, wherein the importance level of the data packet is determined using a frame type of a frame being transported by the data packet, wherein the importance level of the data packet is determined using at least one header parameter of the data packet, wherein the at least one header parameter comprises one of:
        a value of a random access point (RAP) flag field where the data packet includes an MPEG frame; or
        a value of a network abstraction layer (NAL) reference indicator (NRI) field where the data packet includes an H.264 frame;
    duplicating the identified data packet having an importance level satisfying an importance condition;
    inserting the duplicate data packet within the original packet stream to form thereby a modified packet stream, wherein the duplicate data packet is inserted within the original packet stream within an insertion window determined according to a position of the identified data packet within the original packet stream; and
    transmitting the modified packet stream toward a wireless terminal adapted for presenting the conveyed media content.

2. A method for providing media content, comprising:
    identifying, in an original packet stream comprising a plurality of data packets conveying media content, a data packet for which an associated importance level satisfies an importance condition, wherein the importance level of the data packet is determined using a frame type of a frame being transported by the data packet;
    duplicating the identified data packet having an importance level satisfying an importance condition:
    inserting the duplicate data packet within the original packet stream to form thereby a modified packet stream, wherein the duplicate data packet is inserted within the original packet stream within an insertion window determined according to an original position of the identified data packet within the original packet stream, wherein inserting the duplicate packet within the original packet stream comprises:
        identifying the original packet position of the identified data packet within the original packet stream;
        generating, for the duplicate data packet, a new packet position within the original packet stream, wherein the new packet position is located within the insertion window; and
        inserting the duplicate data packet within the new packet position; and
    transmitting the modified packet stream toward a wireless terminal adapted for presenting the conveyed media content.

3. The method of claim 2, wherein the importance level of the data packet is determined using at least one header parameter of the data packet.

4. The method of claim 2, further comprising:
    identifying each data packet of the original packet stream having a respective importance level satisfying an importance condition, wherein the importance level of each data packet is determined using frame types of frames being transported by the respective data packets;
    duplicating each identified data packet having a respective importance level satisfying an importance condition; and
    inserting each duplicate packet within the original packet stream to form the modified packet stream;
    wherein each data packet transporting an I-frame is identified as a data packet having an importance level that satisfies an importance condition, wherein each data packet including a B-frame or a P-frame is identified as a data packet having an importance level that does not satisfy an importance condition.

5. The method of claim 2, wherein the duplicate data packet comprises a sequence number identical to a sequence number of the identified data packet.

6. The method of claim 2, wherein the insertion window has associated with it a window size defined by a number of packet positions from the original packet position of the identified data packet.

7. The method of claim 2, further comprising:
    receiving the modified packet stream; and
    processing the modified packet stream to provide a presentation stream adapted for use by a presentation device.

8. The method of claim 7, wherein processing the modified packet stream for presenting the media content, comprises:
    processing each packet in the modified packet stream according to a packet order determined according to a sequence number associated with each data packet in the modified packet stream; and processing the duplicate data packet for inclusion in the presentation stream when the associated original data packet is missing or corrupted.

9. An apparatus for providing media content, comprising:
means for identifying, in an original packet stream comprising a plurality of data packets conveying media content, a data packet for which an associated importance level satisfies an importance condition, wherein the importance level of the data packet is determined using a frame type of a frame being transported by the data packet;
means for duplicating the identified data packet having an importance level satisfying an importance condition;
means for inserting the duplicate data packet within the original packet stream to form thereby a modified packet stream, wherein the duplicate data packet is inserted within the original packet stream within an insertion window determined according to a position of the identified data packet within the original packet stream, wherein the means for inserting the duplicate packet within the original packet stream comprises:
means for identifying the original packet position of the identified data packet within the original packet stream;
means for generating, for the duplicate data packet, a new packet position within the original packet stream, wherein the new packet position is located within the insertion window; and
means for inserting the duplicate data packet within the new packet position; and
means for transmitting the modified packet stream toward a wireless terminal adapted for presenting the conveyed media content.

10. A method for providing error correction for a data packet stream conveying media content, comprising:
receiving an error correction packet associated with at least one data packet of the data packet stream, the error correction packet having a first error correction level associated therewith;
identifying the error correction packet as being associated with at least one data packet having an importance level satisfying an importance condition; and
modifying the identified error correction packet for changing the first error correction level to a second error correction level different than the first error correction level.

11. The method of claim 10, wherein identifying the error correction packet as being associated with at least one data packet having an importance level satisfying an importance condition comprises:
identifying a data packet having an importance level satisfying an importance condition; and
identifying the error correction packet associated with the identified data packet having an importance level satisfying an importance condition.

12. The method of claim 11, wherein the importance level of the data packet is determined using a packet type associated with the packet, wherein the packet type is determined using at least one header parameter.

13. The method of claim 10, wherein modifying the error correction packet comprises:
identifying an original correction parameter satisfying the first error correction level for the identified error correction packet; and
modifying the original error correction parameter from satisfying the first error correction level to satisfying the second error correction level.

14. The method of claim 13, wherein modifying the original error correction parameter from satisfying the first error correction level to satisfying the second error correction level comprises one of:
replacing the original error correction parameter satisfying the first error correction level with a modified error correction parameter satisfying the second error correction level; or
supplementing the original error correction parameter satisfying the first error correction level with a modified error correction parameter satisfying the second error correction level.

15. The method of claim 10, wherein modifying the identified error correction packet comprises:
computing, for the identified error correction packet, an error correction parameter using information from the identified data packet having an importance level satisfying an importance condition.

16. The method of claim 10, wherein modifying the identified error correction packet further comprises:
computing, for the identified error correction packet, an error correction parameter using:
information from the data packet having an importance level satisfying an importance condition; and
information from at least one data packet adjacent to the data packet having an importance level satisfying an importance condition.

17. The method of claim 10, further comprising:
transmitting the data packet stream and the modified error correction packet toward at least one wireless terminal adapted for processing the data packet stream for presenting the media content.

18. The method of claim 17, further comprising:
processing the data packet stream to provide a presentation stream adapted for use by the wireless terminal in presenting the media content.

19. The method of claim 18, wherein processing the data packet stream comprises:
in response to identifying an error associated with the identified data packet having an importance level satisfying an importance condition, processing the modified error correction packet to correct the identified error for the identified data packet having an importance level satisfying an importance condition; and
processing the corrected data packet for inclusion in the presentation stream.

20. An apparatus for providing error correction for a data packet stream conveying media content, comprising:
means for receiving an error correction packet associated with at least one data packet of the data packet stream, the error correction packet having a first error correction level associated therewith;
means for identifying the error correction packet as being associated with at least one data packet having an importance level satisfying an importance condition; and
means for modifying the identified error correction packet for changing the first error correction level to a second error correction level different than the first error correction level.

21. A system, comprising:
a content server adapted for receiving media content from a content provider server; and
a gateway element coupled to the content server for receiving, from the content server, an original data packet stream conveying the media content from the content provider server, the original data packet stream comprising a plurality of data packets;

the gateway element adapted for identifying ones of the data packets having respective importance levels satisfying an importance condition, duplicating the identified ones of the data packets having respective importance levels satisfying an importance condition, and inserting the duplicate data packets within the original data packet stream to form thereby a modified data packet stream, wherein the inserting the duplicate packet within the original packet stream comprises:

identifying the original packet position of the identified data packet within the original packet stream;

generating, for the duplicate data packet, a new packet position within the original packet stream, wherein the new packet position is located within the insertion window; and inserting the duplicate data packet within the new packet position; the gateway element adapted for propagating the modified data packet stream toward at least one wireless terminal adapted for processing the modified data packet stream for presenting the media content.

* * * * *

UNITED STATES PATENT AND TRADEMARK OFFICE
CERTIFICATE OF CORRECTION

PATENT NO. : 7,653,055 B2  Page 1 of 1
APPLICATION NO. : 11/396371
DATED : January 26, 2010
INVENTOR(S) : Guo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 831 days.

Signed and Sealed this

Twenty-eighth Day of December, 2010

David J. Kappos
*Director of the United States Patent and Trademark Office*